United States Patent Office 3,365,286
Patented Jan. 23, 1968

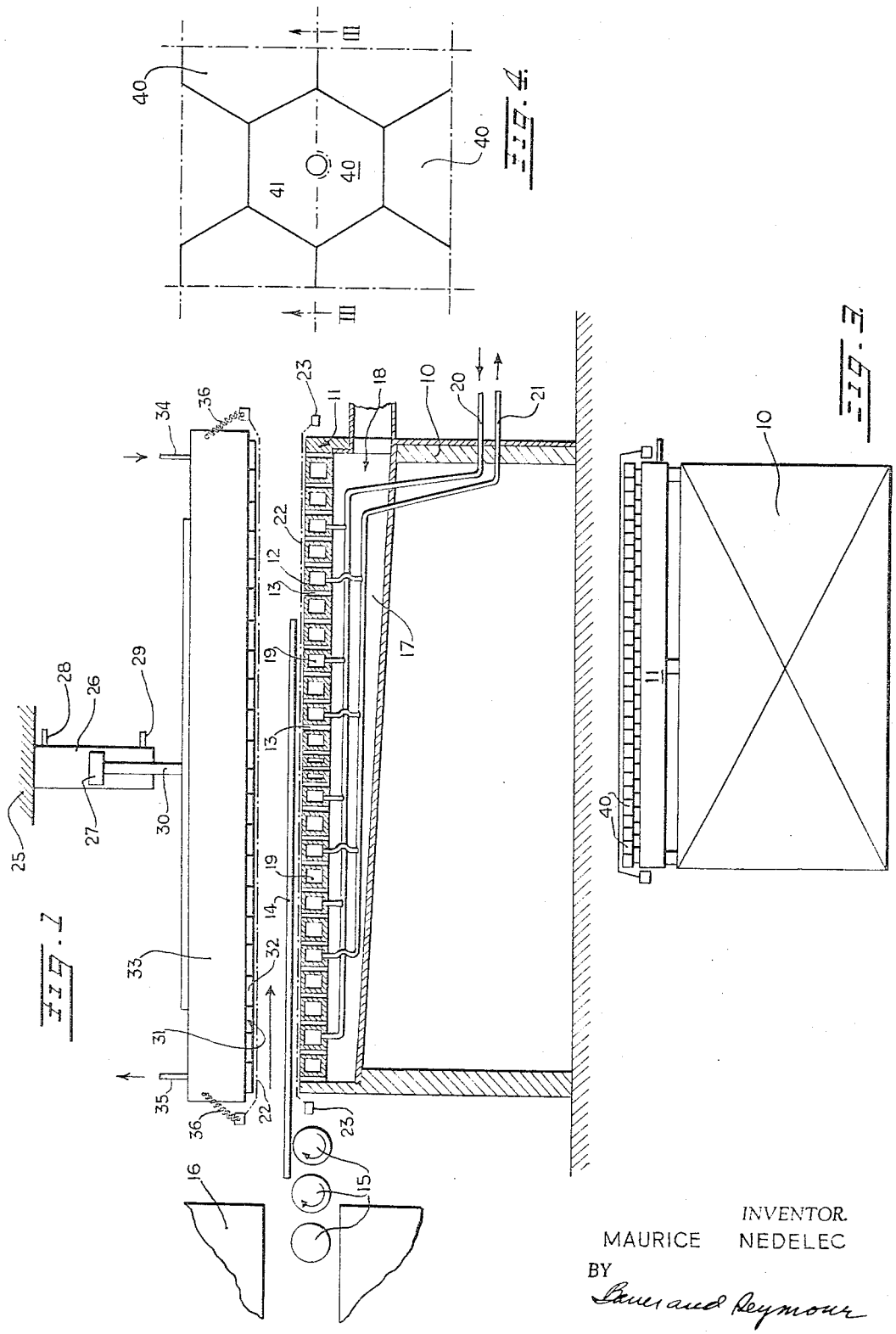

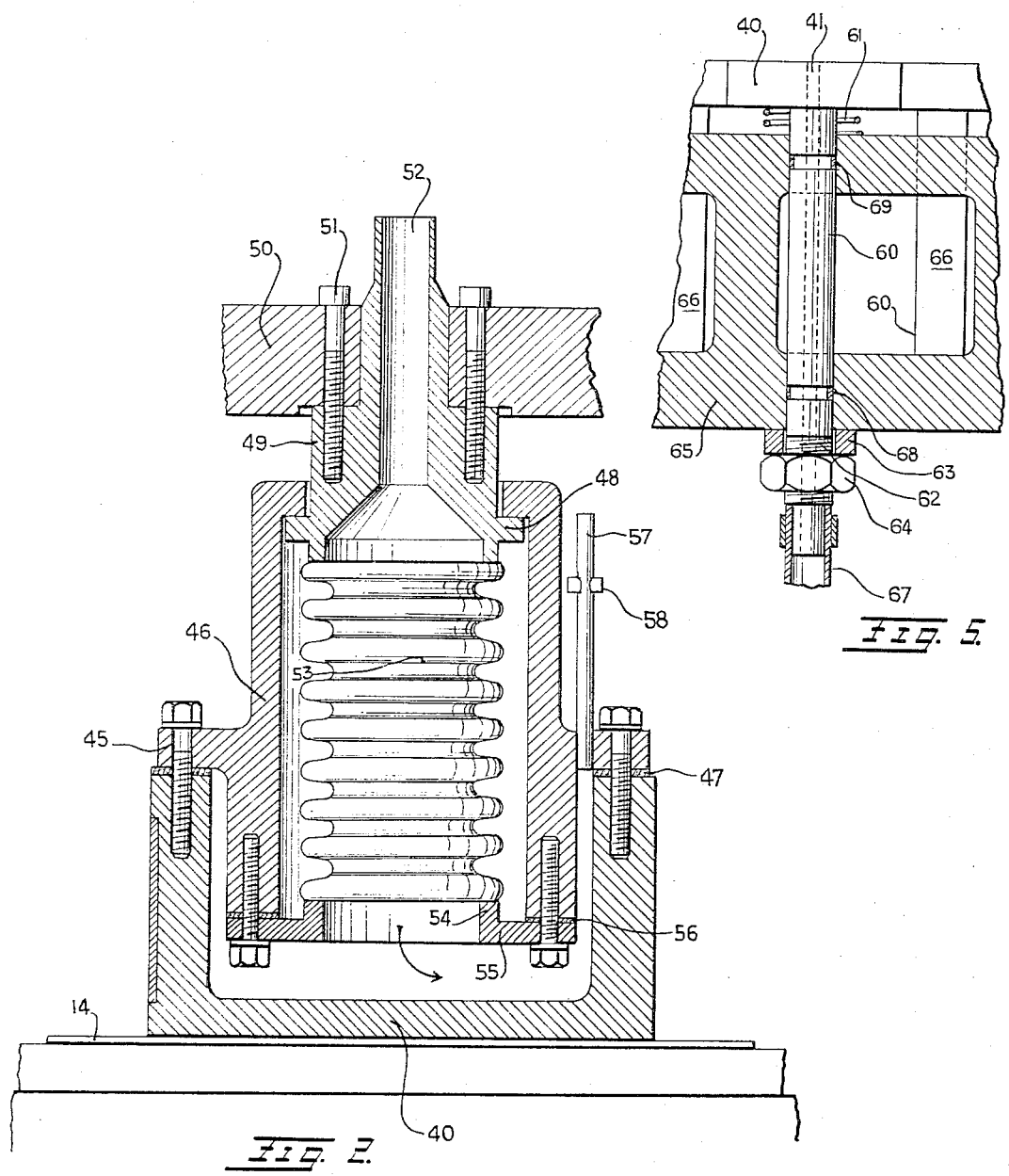

3,365,286
METHOD OF AND APPARATUS FOR TEMPERING OF GLASS BETWEEN COLD PLATES
Maurice Nedelec, Paris, France, assignor to Compagnie de Saint-Gobain, Neuilly-sur-Seine, France
Filed Mar. 26, 1964, Ser. No. 355,051
Claims priority, application France, Mar. 29, 1963, 929,817; Aug. 14, 1963, 944,785
16 Claims. (Cl. 65—114)

This invention relates to the tempering of glass sheets. In a broad aspect the invention concerns apparatus for exchanging heat with sheets of any material. This invention makes it possible to temper glass in a horizontal position.

The standard method of tempering glass plate is to suspend the plate from pincers at softening temperature and blow it violently with cold air on both sides. Other methods of tempering have been used including immersion in a cold liquid, and contact with cold surfaces, but such vertical methods have had difficulties when applied to large sheets of the size of doors and display windows. It has accordingly been proposed to temper the glass horizontally but this has had the difficulty that the supporting means mars the surface and the cooling means produces an objectionable inequality of temper. The first great difficulty arises in heating the glass horizontally and transferring it from the furnace to the tempering apparatus without deformation and without impairing the surface polish. The second great difficulty has been to remove the heat at an equal rate in all parts of the glass sheet, taking into consideration the necessity of providing substantial surface support to prevent the sagging of the hot glass. The extent of this difficulty can be apprehended if one also considers that cold air blown against the surface of the sheet at the edges escapes immediately whereas that directed against the center of the sheet passes over other areas of the hot sheet before escaping. This makes for fast cooling at the edges and slow cooling at the center.

It is an object of the invention to cool all areas of a glass sheet at the same rate. Another object is to support extensive sheets throughout while leaving the supported surface exposed. Another object is to move hot glass into tempering position without damaging its surface. Another object is an apparatus for exchanging heat with a flat or curved surface which will accommodate itself to irregularities of surface and thus achieve uniformity of heat exchange. Another object is to protect the heat exchange apparatus against breakage and to control the rate of heat exchange by auxiliary means. Other objects of the invention will be in part apparent and in part herein described.

The objects of the invention are accomplished as to process by a method of tempering a glass sheet which comprises heating the sheet to about softening temperature, supporting the sheet on a cushion of air, transporting it thus supported and stopping it, clamping it between thermally conductive surfaces, and cooling the surfaces, and as to apparatus the objects of the invention are accomplished by heat exchanging apparatus including a plate divided into distinct, relatively movable, work-contacting elements, means to cool the elements continuously, and means to eject a gas through the plate toward the position of the work, said means being substantially uniformly distributed throughout the operative area of the plate.

The present invention includes tempering apparatus which handles large sheets horizontally and introduces them on a cushion of air, between confronting, heat exchanging plates which are supplied with cooling means, the operative faces of the cooling plates, being composed, in the preferred form of the invention, of relatively movable, individual elements which are adapted to conform to irregularities in the surface of the sheet of glass or other material which is undergoing heat exchange.

The cooling plates are subtended by chambers for the flow of cooling fluids, uniformly distributed so that the entire surface of the cooling plate is cooled continuously at substantially the same rate. The rate of cooling can be controlled by the rate at which the cooling medium flows through the chambers in contact with the elements of the cooling plates and it can be affected by applying fabrics over the plates which will protect the surface of the glass against direct contact with the plates and also serve to regulate the rate at which the heat exchange occurs. It is sometimes easier to achieve a selected rate of heat transfer by this means than by attempting to regulate the flow of heat exchange medium over the surface of the cooling plate. The subdivision of the cooling plates into individual elements also has this advantage, that certain elements can be cooled less vigorously than others, for instance by supplying water at a different rate, in order to introduce differential temper into selected areas of the glass.

It is an unexpected discovery that such large sheets of glass can be handled pneumatically at or near their softening temperature. In the present invention the broad surface of the lower cooling plate is provided with a flow of air sufficiently intense to form a supporting cushion which will support the sheet of glass out of contact with the cooling plate. The sheet of glass can thus be moved from the furnace between the plates of the tempering apparatus without making contact with mechanical supporting means, or by minimum contact with such means as rollers. It is our discovery that the flow of air required is not excessive, and does not produce imperfections in the surface of the sheet. It would have been doubted that a sheet of glass at softening temperature would remain undeformed by a cushion of gas at sufficient velocity to support it. It would also have been thought that the flow of gas against the surface of the sheet would have initiated local tempering of sufficient degree to produce undesirable inequalities in the finished sheet, but it is our discovery that no such inequality is produced by the jets. It would have also been doubted that the jets would act to sustain the sheet uniformly throughout its area but, again, no such difficulty has arisen; the sheet is sustained throughout its area and does not enter into contact with the metal of the cooling plates.

There are certain irregularities of level in sheets and one of the difficulties which has been experienced by prior experimentation with cooling plates has been the lack of uniform contact and a resulting irregularity of tempering. The present invention has overcome that difficulty by providing discrete units in the cooling plates which conform to the differences of level and produce a substantially uniform tempering. According to the preferred construction the upper and lower sheets are composed of resiliently supported elements, which allows the plates to be pressed against the glass sheet with the force desired without introducing breaking strains in parts of the sheet which are displaced from a true plane. If sufficient force is applied by the cooling plates, some corrective, flattening action can be achieved although this is not ordinarily necessary or desirable.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIG. 1 is an elevation of the apparatus, partly in section;

FIG. 2 is a vertical section through an upper element;

FIG. 3 is an elevation of a modified form of a lower support which embodies the elements of FIG. 5;

FIG. 4 is a plan view of a limited area of the cooling face of the apparatus of FIG. 5; and FIG. 5 is a vertical section through a lower element, taken on line III—III of FIG. 4.

Referring to FIG. 1, a table 10 supports a cooling plate 11 which has an upper surface 12 which is provided throughout its area with equally spaced conduits 13 which extend completely through it and constitute the discharge ports for the jets of air which are to support the glass sheet 14 as it is delivered by rollers 15 from the furnace 16. Beneath the plate 11 is an air box 17 which is supplied by a duct 18 with air under pressure sufficient, when expelled through the ports to form jets which will support the glass. The plate 11 is hollow as indicated at 19 and the hollow portions may be wholly interconnected or they may be interconnected in individually supplied groups to which the flow of water may be regulated by valves. A water main 20 is connected to the hollow chambers 19 at various spaced points in order to maintain uniform cooling temperature throughout the face of the plate 11. Discharge main 21 receives the discharged water. The water from main 20 may be supplied by a cooler to which the water from main 21 returns. A piece of fabric 22 overlies the surface of the table, its ends attached to weighted bars 23 which serve to keep it taut under ordinary conditions and to lift it and the pieces of glass should the glass break above it. This piece of cloth serves to control the rate of heat exchange as it reduces the rate when thick and increases the rate when thin. The cloth is porous and offers no substantial interference to the jets. Indeed, the cloth may be cut away above the ports if desired. The cloth serves to retard the flow of supporting gas. This table, consequently, provides a perfectly flat surface for the reception of the glass, which is delivered by the rollers 15 to the jets and is supported by the jets until it is centered on the table. If desired the jets at the receiving end of the table may be angularly inclined toward the discharge end so as to furnish a driving force to move the glass sheet fully onto the cooling table.

When the sheet has been centered above the table the jets are reduced by slowing the speed of the fans which supply the compressed air to box 17 and the sheet subsides without horizontal motion upon the fabric, where it remains until the tempering is completed. It may be assumed that no cooling water has yet been admitted to the chambers in the cooling plate and that the rate of cooling between the sheet and the plate is too slow to produce any substantial tempering.

Above the plate 12 is a support 25 from which depends a cylinder 26 containing a piston 27 which is moved upwardly or downwardly by compressed air which is supplied through ports 28, 29. This piston supports, through piston rod 30, a plate 31 which is composed of discrete elements 32 each of which is independently mounted, for limited vertical movement, on the supporting carrier 33 to which water is supplied by main 34 and from which it is removed through main 35. The details of construction of this upper plate will be set forth hereinafter.

A fabric 22' similar to 22 is supported by springs 36 over the face of the cooling elements 32. In their inoperative position the faces of the cooling elements lie in a single plane.

The glass plate having subsided onto the table the upper plate is lowered into contact with it. If there are any inequalities of surface, the elements 32 conform and compensate so that substantially uniform contact is obtained throughout the area of the upper plate. Cooled water is now circulated through the upper and lower plates which, being thus vigorously and continuously cooled, rapidly draw the heat out of the plate, lower its temperature sharply and temper it. Tempering is usually completed when the temperature of the glass has passed down through the strain point, and at that time the flow of water may be discontinued, but if further cooling is desirable before the plate is moved it may be continued until the sheet is cold. The cooling having been completed to the selected end point the supporting carrier 33 is lifted, the air jets are turned on, lifting the sheet off the table and the sheet is floated off the table on its cushion of air.

In FIG. 3 is shown a modification of the table 10 in which the cooling plate 11 is provided with discrete elements 40 which are resiliently mounted and which, in inoperative position, present a continuous flat surface for the reception of the glass.

FIG. 4 illustrates a hexagonal shape for the discrete elements 40 which constitute the upper surface of the plate. These elements are contiguous and certain of them are provided with ports 41 from which the jets of air are projected to form the supporting cushion. The hexagonal shape is convenient but any other geometric shape may be employed. Indeed, FIG. 2 shows the use of rectangles or squares 40' in the upper cooling plate and FIG. 5 shows the use of hexagons in the lower.

There is shown in FIG. 2 the mounting of the individual cooling elements in the upper support, wherein cooling element 40' is a pot which is attached at its upper edge to a circumference flange 45 which projects from a holder 46, the joint being made fluid tight by a gasket 47. The holder 46 is retained by a flange 48 on a head 49 which projects through supporting plate 50, in which it is mounted by bolts 51. The interior of the hollow support head 49 is tubular as indicated at 52 and this conduit furnishes cooling fluid, either water or cold gas, to the inside of the accordion tube 53 which is connected to a circular flange 54 on a plate 55, which is connected to the lower end of the cylindrical member 46, the joint being made tight by a gasket 56. The cooling fluid may proceed downward through tube 52 and may escape through tube 57 which may be provided with a valve, or an adjustable constriction 58 in case of a flexible tube, to control the rate of flow. The supporting plate 50 may be the bottom of a chamber into which cooling fluid, for instance water, is admitted through an appropriate main. As the water in the chamber above the plate 50 will be at uniform temperature and as the flow into the cooling elements 40' will be uniform there will be uniformity of cooling throughout the entire area of the sheet. It is believed that such uniformity has not previously been achieved.

The preferred form of the lower plate is also provided with individually movable cooling elements as indicated in FIG. 5 wherein the surface of the plate is composed of the combined surfaces of the elements 40, each of which is mounted upon a stem 60 and biased into its upper position by a spring 61. The lower end of the stem is screw threaded as at 62 and the position of the head, at rest, is fixed by means of a washer 63 and nut 64, which bear against the bottom of the water chamber 65, the internal construction of which is similar to that of 19, having interconnected passages 66 for the cooling fluid. Uniformly spaced heads and stems are provided with ports 41 which connect with air supply pipes 67, or with an air chamber similar to that of FIG. 1 if desired, and through these pipes and tubes air is forced to form the jets for the supporting cushion. The stems 60 pass through the chambers 65 and are cooled or heated by the fluid therein, as the case may be. The pots 40 and the stems are made of highly heat-conductive metal, for instance copper or aluminum, and the withdrawal of or input of heat may be as rapid as desired. The stems are sealed above and below the water chamber by gaskets 68, 69.

In the form of the table of FIG. 1 the upper surface may be provided with intaglios or grooves which describe in the surface independent zones which allow the expansion and contraction of the surface itself without introducing a deformation of the whole of the plate. Another method of meeting the problem of expansion is to make the plate, or to apply upon it a sheet, of alloy having a low coefficient of expansion, such as invar. Such plate will, of course, be pierced above the blow holes.

In the operation of the apparatus:

The sheet of glass is passed into the horizontal furnace 16, it is heated there to about the softening point and is moved between the upper and lower plates of the tempering apparatus, supported on a cushion of air. Having reached its proper position the jets of air are turned off, the plate sinks vertically upon the fabric and the upper plate is lowered upon it. Almost all motion is vertical and there is no horizontal motion which could produce a defective surface. The water is then turned into the upper and lower chambers and the cooling of the surfaces adjacent the glass proceeds, withdrawing from the glass the heat at whatever rate is desired, the rate being controlled by the rapidity of circulation and the temperature of the medium. The individual cooling elements conform to the surfaces of the sheet and substantially compensate for irregularities of level so that general uniformity of contact promotes uniformity of cooling. Cooling having been completed the upper plate is lifted, the jets are turned on, floating the sheet, and the sheet is removed to whatever carrier is in use for the purpose. Ordinary carrier means are adequate at this stage as the surfaces are sufficiently hard to withstand abrasion.

Two methods of cooling are indicated, each of them novel, the first by the direct flow of water across the back of the cooling plate and the second the cooling of a metal which extends between the cooling surfaces of the plate and the cooling water. By this invention there is achieved uniformity of tempering which was not previously possible. It is also possible to handle large sheets without producing in them those imperfections which were caused by the standard means. When the standard means employed was suspension, the suspending pincers introduced deformities where they acted. In the present case there are no such deformities. In other circumstances the suspension of heavy sheets was not altogether satisfactory because of breakage. The breakage rate is reduced by this invention. In prior methods of handling sheets horizontally abrasions and imperfections appeared because of the contact of mechanical handling means with the hot glass. In the present case the entire support of the glass from the furnace to the tempering apparatus can be pneumatic, the rolls 15 being shown only as illustrative. If the surface of the apparatus is marred or any of its parts become damaged they are readily replaced and are adjustable into alignment with contiguous elements.

As many apparently widely different embodiments of the present invention may be made without departing from the spirit and scope thereof, it is to be understood that the invention is not limited to the specific embodiments.

What is claimed is:

1. A method of tempering a glass sheet which comprises heating the sheet to about softening temperature, moving the hot sheet horizontally on a cushion of air into position between a pair of cold plates, stopping it between the plates, bringing the plates into contact with the sheet, and continuously cooling the plates until the sheet is tempered.

2. A method of tempering a glass sheet which comprises heating the sheet to about softening temperature, supporting the sheet horizontally on a cushion of air, transporting it thus supported and stopping it, clamping it between thermally conductive surfaces, and cooling the surfaces.

3. A method of tempering a glass sheet which comprises heating the sheet to about softening temperature, supporting the sheet horizontally on a cushion of air, transporting it thus supported and stopping it, clamping it between a multiplicity of contiguous, relatively movable, heat conductive, cooling elements, moving the elements into contact with the opposite sides of the sheet, and cooling the elements, thereby tempering the sheet.

4. A method of tempering a glass sheet which comprises heating the sheet to about softening temperature, supporting the sheet horizontally on a cushion of air, transporting it thus supported and stopping it, clamping it between a multiplicity of contiguous relatively movable, heat conductive, cooling elements, moving the elements into contact with the opposite sides of the sheet, and cooling a portion of the elements vigorously while leaving others relatively uncooled, thereby imparting differential temper to the sheet.

5. Apparatus for the support, cooling and tempering of sheets in horizontal position, comprising, lower and upper superposed hollow, heat conductive plates having substantially continuous, confronting surfaces, one said plate being fixed in horizontal position, means to translate the other said plate vertically, from a first position wherein said plates are vertically spaced, to a second position wherein said plates are in contact with the sheet to be tempered, a plurality of conduits distributed over the area of its upper surface and passing through the lower hollow plate, means to supply all said conduits with air under pressure to support a sheet thereover, upon a gaseous cushion, and circulating means to feed coolant into the hollow plates and to exhaust the same from the interior of each said hollow plate, when said plates are in surface contact with respective faces of a sheet emplaced therebetween.

6. The apparatus of claim 5 and means to move a sheet onto the cushion of air between the plates.

7. The apparatus of claim 5, said upper plate being formed of a plurality of discrete elements each having a lower surface, all said lower surfaces interfitting to form an essentially continuous plane unbroken surface, and means mounting each said element for translation of its said lower surface, vertically with respect to said plane, so that said upper plate may conform generally to the contour of a sheet contacted thereby.

8. Sheet tempering apparatus comprising a hollow heat conductive table having an essentially continuous horizontal upper surface, to receive and support a sheet for tempering, there being a plurality of conduits passing through the hollow table, distributed over and opening through said horizontal upper surface, means to supply air under pressure to all said conduits, and means to flow coolant through the interior of said hollow table, whereby to cool said hollow table and the surface thereof.

9. The apparatus of claim 8, said table comprising a plurality of hollow elements, interfitting to conjointly define said horizontal upper surface, said last-named means comprising conduit connections to flow coolant individually through the hollow interior of each said element.

10. A tempering plate adapted for the contact tempering of a horizontal glass sheet, comprising a plurality of individually, vertically movable, resiliently biased contiguous elements having faces forming a smooth substantially continuous and unbroken surface, and continuously operable, fluid heat exchanging means individually associated with said faces to cool the same while said faces are in contact with a sheet to be tempered.

11. The apparatus of claim 10, each said element being hollow to form an internal chamber contiguous to said face thereof, first conduit means connected with all said chambers to flow heat exchange fluid into each said chamber, and second conduit means connected with each said chamber to exhaust heat exchange fluid therefrom.

12. The apparatus of claim 11, means mounting each said element for yieldable translation out of the surface conjointly formed by said elements, said second conduit means including a plurality of valves, each operable to control the rate of exhaust of fluid from a respective one of said chambers.

13. The plate of claim 10, there being a plurality of ports each opening through the face of a respective one of said elements, a plurality of hollow stems each connected with and supporting a respective one of said elements, for individual yielding translation out of the common surface conjointly formed thereby, each said stem being in communication with a respective one of said ports, means guidably supporting each said stem and forming a hollow chamber thereabout, means to supply fluid under pressure to each said stem, to form a sheet-supporting jet from each said port, said heat exchange means including means to flow coolant fluid to and exhaust the same from said hollow chamber.

14. Heat exchanging apparatus for cooling and tempering sheet material, comprising, a plurality of discrete, heat conductive, relatively movable work-contacting elements capable of conjointly forming a smooth, continuous, and essentially unbroken surface, means to continuously cool said elements internally, means to eject a gas through a plurality of conduits which pass through said elements and have openings through the surfaces thereof, said conduits being substantially uniformly distributed over the operative area of said surface, and a heat resistant, porous flexible fabric extending over said surface, to cover the same.

15. Apparatus for tempering and cooling sheet glass, comprising, upper and lower superposed hollow plates having confronting essentially smooth continuous and coextensive surfaces, said lower plate having passages opening through its said surface and distributed over its area, and through which gas may be forced to form jets constituting a supporting cushion for a sheet in movement between said plates, means operable to translate said plates toward one another to contact respective surfaces of a sheet positioned therebetween, and means to pass coolant to and through said hollow plates to cool the said surfaces thereof.

16. The apparatus of claim 10 and means supporting said elements and operable to translate the same as a unit in direction normal to said surface.

References Cited
UNITED STATES PATENTS 2,677,918   5/1954   Bird et al. _____ 65—348

FOREIGN PATENTS 505,189   5/1939   Great Britain.

DONALL H. SYLVESTER, *Primary Examiner.*

A. D. KELLOGG, *Assistant Examiner.*